United States Patent [19]

Rudd, III

[11] Patent Number: 4,477,869

[45] Date of Patent: Oct. 16, 1984

[54] PULSED APERTURE FOR AN ELECTROSTATIC INK JET SYSTEM

[75] Inventor: Robert E. Rudd, III, Maywood, N.J.

[73] Assignee: Burroughs Corporation, Detroit, Mich.

[21] Appl. No.: 489,503

[22] Filed: Apr. 28, 1983

[51] Int. Cl.[3] .............................................. G01D 15/16

[52] U.S. Cl. ................................. 346/140 R; 358/296

[58] Field of Search ............. 346/140 R, 75; 400/126; 358/296

[56] References Cited

U.S. PATENT DOCUMENTS

| | | | |
|---|---|---|---|
| 3,060,429 | 10/1962 | Winston | 346/140 X |
| 3,341,859 | 9/1967 | Adams | 346/140 |
| 4,349,830 | 9/1982 | Rudd | 346/140 |
| 4,404,573 | 9/1983 | Kocot | 346/140 |

*Primary Examiner*—Joseph W. Hartary

*Attorney, Agent, or Firm*—Mark T. Starr; Edmund M. Chung; K. R. Peterson

[57] ABSTRACT

Disclosed is an electrostatic ink jet printing system which provides improved frequency response of the mass flow of ink deposited on a recording medium. In accordance with the invention, an ink jet nozzle is conductively connected to an ink reservoir. A conductive platen maintained at a reference voltage level is positioned in front of the nozzle. A sheet of paper is positioned on the surface of the platen. Positioned between the paper and nozzle is a conductive plate having an aperture through which ink emanating from the nozzle is directed.

A video data signal input to the system is amplified and biased before being applied to the nozzle. At the same time, the video data signal is also inverted, then fed through a differentiator and finally amplified before being applied to the conductive plate. As a result of the voltage signals applied to the nozzle and plate, a unique electric field is generated between the tip of the nozzle and the plate. This electric field exerts a force on the ink at the tip of the nozzle causing a mass flow of the ink. As a result of the unique characteristics of the electric field, the frequency response of the mass flow is improved, thereby producing sharper images on the paper.

16 Claims, 8 Drawing Figures

PULSED APERTURE FOR AN ELECTROSTATIC INK JET SYSTEM

BACKGROUND OF THE INVENTION

1. Field of the Invention

This invention relates in general to an apparatus which records images by jetting a liquid imaging material in a controlled manner. More particularly, this invention relates to an apparatus for depositing ink on a receiving surface by electrostatic generation of intermittent jetting of the ink in response to a video signal.

2. Description of the Prior Art

In the past, there have been numerous attempts to effect non-impact printing by positioning a conductive platen behind a sheet of recording medium such as paper, and then attracting the ink to the platen by an electrostatic field, thereby attracting the ink to the paper. Examples of such prior art techniques may be found in U.S. Pat. Nos. 3,060,429 and 3,341,859, and in pending U.S. patent application Ser. No. 487,268, filed Apr. 21, 1983 by Ray H. Kocot for an Electrostatic Ink Jet System With Potential Barrier Aperture. The later mentioned patent application is incorporated by reference in the present application.

These prior art systems use various techniques to apply a high voltage potential to an ink jet nozzle which is supplied with ink. The applied voltage potential creates an electric field at the tip of the nozzle. The electric field exerts a force on the ink at the tip of the nozzle creating a mass flow of the ink. In all of the prior art techniques, the frequency response of the mass flow does not follow that of the electric field. As a result, the image produced by the mass flow of ink being deposited on the recording medium is not sharp.

It is the general object of the present invention to overcome these and other drawbacks of the prior art by providing an electrostatic ink jet printing system which delivers a jet of ink from an ink jet nozzle to a printing surface in a controlled manner.

It is another object of the present invention to provide an electrostatic ink jet printer which produces sharper images than produced by prior art systems.

It is still another object of the present invention to provide an electrostatic ink jet printer which includes a potential barrier which blocks the effect of stray or unwanted electrostatic charges which build up on the printing medium.

It is a further object of the present invention to provide an electrostatic ink jet printing system providing a flow of ink having improved frequency response.

These and other objects and advantages of the present invention will become more apparent from reading the following detailed description of the invention in conjunction with the drawings.

SUMMARY OF THE INVENTION

In accordance with the present invention, an ink jet nozzle is conductively connected to an ink reservoir containing conductive ink. A conductive platen (or drum) maintained at a reference voltage level is positioned in front of the ink jet nozzle. A sheet of paper or other printing medium is positioned on the surface of the platen facing the ink jet nozzle. Positioned between the paper and ink jet nozzle is a conductive plate having an aperture through which ink emanating from the ink jet nozzle is directed.

A video data signal input to the system is biased and amplified before being applied to the ink jet nozzle. At the same time, the video data signal is also inverted, then fed through a differentiator and finally amplified before being applied to the conductive plate. The differentiator generates negative and positive spikes in response to positive and negative shifts in the video data signal, respectively. As a result of the voltage signals applied to the nozzle and plate, an electric field is generated between the tip of the nozzle and the plate. This electric field has a short time duration spike each time the level of the input video data changes, the direction of the spike being the same as the direction of change of the input video data.

The electric field exerts a force on the ink at the tip of the nozzle causing a mass flow of ink. As a result of the unique characteristics of the electric field, the frequency response of the mass flow is greatly improved, thereby producing sharper images on the printing medium.

DETAILED DESCRIPTION OF THE INVENTION

Figure 1:
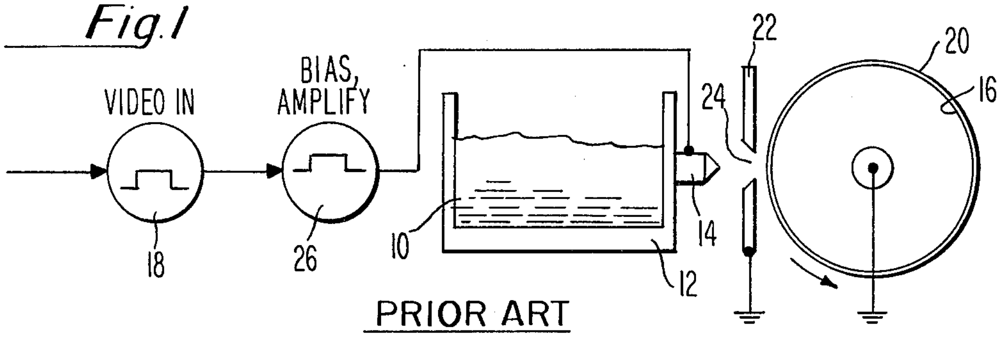
FIG. 1 shows a prior art electrostatic ink jet printing system.

Referring to FIG. 1, shown is a prior art electrostatic ink jet printing system. In such a prior art system, an ink jet supply 10 is contained in ink reservoir 12. The ink reservoir 12 may be formed from a moldable material such as polypropylene which is resistent to chemical reaction with the ink 10. The ink jet nozzle 14 is fabricated from stainless steel. The tip of the nozzle is ideally shaped in a cone having the configuration described in U.S. Pat. No. 4,349,830. The head height of ink 10 is chosen to provide sufficient pressure to the nozzle 14 to form a bulge or convex meniscus at the tip of the nozzle 14, but not sufficient to produce a flow of ink 10 out of the nozzle 14.

In the prior art system, an electric field is established between the nozzle 14 and a conductive plate 22 which is positioned opposite the exit of the nozzle 14, by applying a potential to the nozzle 14, whereby the ink 10 is drawn out and the bulge will be drawn into an elongated shape having a tip from which a fine ray-like jet is drawn toward the platen 16. This will result in a jet of ink 10 being directed from the nozzle 14, through the aperture 24 and toward the platen 16, approximately in a direction normal to the surface of the platen 16. If a sheet of paper 20 is placed against the platen 16, a line may be drawn on the sheet 20 if the platen 16 is rotated. Interruption of the jet may be effected by reducing the potential difference 18 between the plate 22 and the nozzle 14, and consequently, marks of controlled length may be made on the sheet of paper 20.

In the prior art system (FIG. 1), the platen 16 is a metallic drum on the outside of which the paper 20 is attached. Alternately, the platen 16 may be a flat metallic plate.

A video in signal is input to the prior art system (FIG. 1) by video signal generator 18. When the video in signal is high, jetting is to occur. When the video in signal is low, no jetting is to occur. The design of the means used to generate the video in signal is well known in the prior art.

In order to create the electric field, the video in signal 18 is biased and amplified in element 26, the circuitry to accomplish this function being well known to those skilled in the art. Typically the video in signal switches between 0 and 5 volts, the up (5V) level corresponding to a write signal (or data bit). The bias/amplifier 26 transforms the video in signal to one which switches between 2KV and 4KV, a 2KV output ($V_1$) corresponding to a 0 level video in signal and the 4KV output ($V_2$) corresponding to a 5 volt level video in signal.

In the prior art system, $V_B$ is a transition voltage generally between 2500 and 3500 volts. When the voltage signal applied to nozzle 14 by bias/amplifier 26 is greater than $V_B$, jetting occurs. When the applied voltage level is below $V_B$, jetting does not occur. The duration of the jet is controlled by the amount of time the applied voltage level remains above the threshold level. Interruption of the jet is effected by the bias/ amplifier unit 26 dropping its voltage output in response to the video in signal dropping.

FIG. 2A shows the high voltage waveform applied by bias/amplifier unit 26 between the nozzle 14 and plate 22. This waveform creates an electric field at the tip of the nozzle 14 as shown in FIG. 2B. The electric field exerts a force on the ink 10 at the tip of the nozzle 14, thus creating a mass flow of ink 10. The waveform of this mass flow is shown in FIG. 2C.

Comparing the mass flow waveform (FIG. 2C) with the electric field waveform (FIG. 2B), it can be seen that the mass flow has lost frequency response. As shown in FIG. 2D, as a result the images produced by the mass flow are not sharp and show poor frequency response with respect to the electric field (FIG. 2B).

Note that the two image spots shown in FIG. 2D are the result of two separate activations of the nozzle 14, the paper 20 being vertically repositioned by rotating drum 16 between the two nozzle 14 activations.

The effects of $V_1$ and $V_2$ on mass flow and frequency response are intertwined and conflicting. $V_2$ controls the mass flow of the ink 10. If $V_2$ is increased, the mass flow is increased. The response time to a data bit depends on $V_1$, $V_2$, and their relationship to $V_B$. The best rise time (0-98%) for the ink flow occurs when $V_1 = V_B$ and $V_2$ is a maximum limited by corona discharge. The best fall time (100%-2%) for the ink flow occurs when $V_1 = 0$. The nozzle voltage waveform (FIG. 2A) provided by the prior art system (FIG. 1) offers a compromise between desirable mass flow and frequency response.

Improved frequency response of the mass flow will result in sharper images being produced on paper 20. This can be accomplished by applying a voltage waveform to the nozzle 14 as shown in FIG. 3A. Thus, the high voltage waveform is altered by the addition of "spikes" on the leading and trailing edges of the waveform. The application of such a voltage waveform between the nozzle 14 and plate 22 produces a similar shaped electric field at the tip of the nozzle 14 (FIG. 3B). The limitation of a system employing such an electric field (FIG. 3B) is the electric break-down strength of air. Thus, if the electric field produced exceeds the breakdown strength of air, arcs and shorts will be produced.

Figure 2:
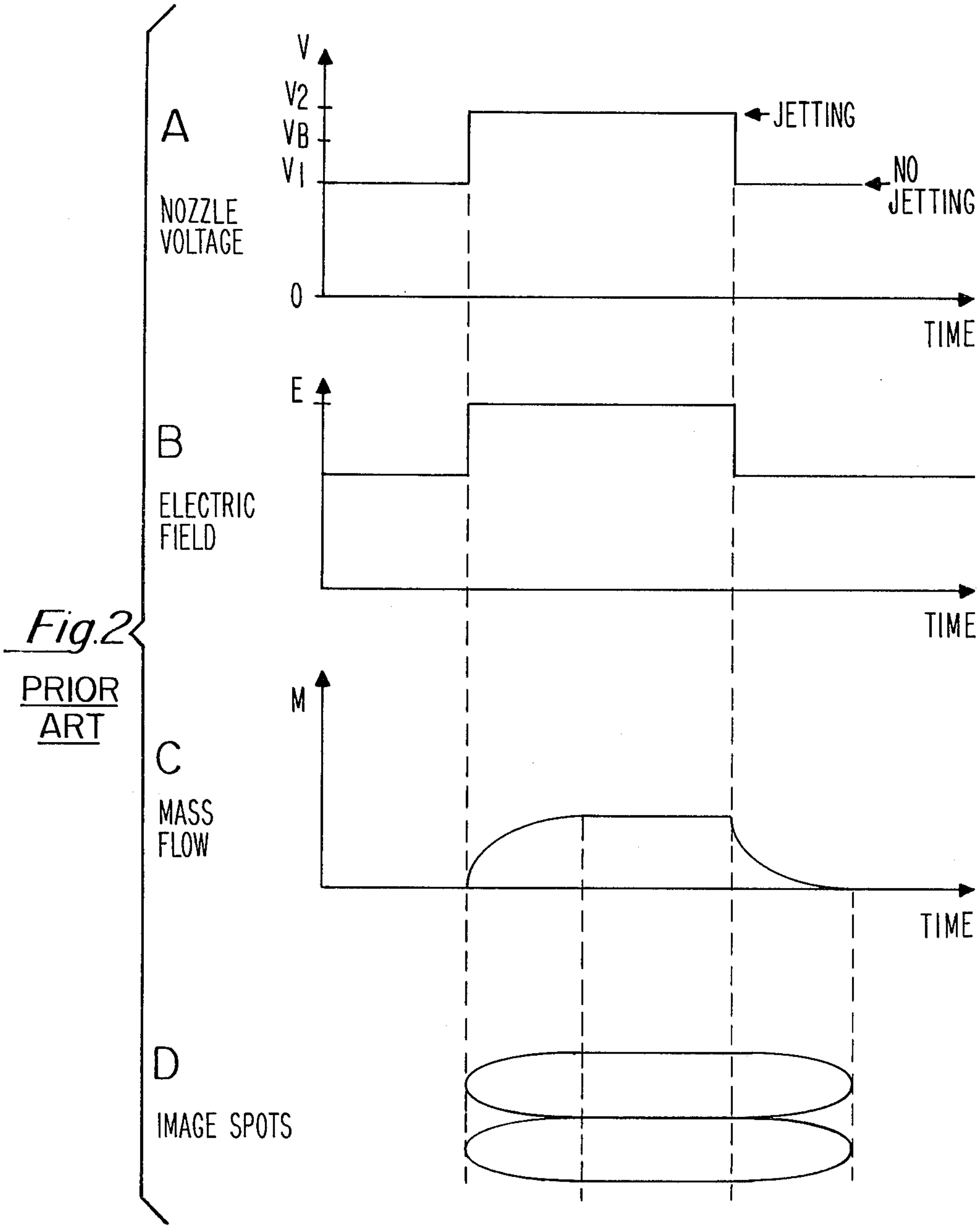
Fig.2 PRIOR ART
FIG. 2 shows the nozzle voltage waveform, electric field, mass flow and image spots produced as a result of applying a video signal data bit to the prior art system of FIG. 1.

FIG. 3C and 3D show the mass flow and image that will be produced utilizing the voltage waveform of FIG. 3A. It will be noted that the mass flow responds more quickly and creates a sharper image than with the voltage waveform used in the prior art (FIG. 2).

In the voltage waveform of FIG. 3A, the time duration of the "spikes" is short so that the mass flow and image do not overshoot. The effects of having too long a time duration of the "spikes" is shown in FIG. 4.

Figure 3:
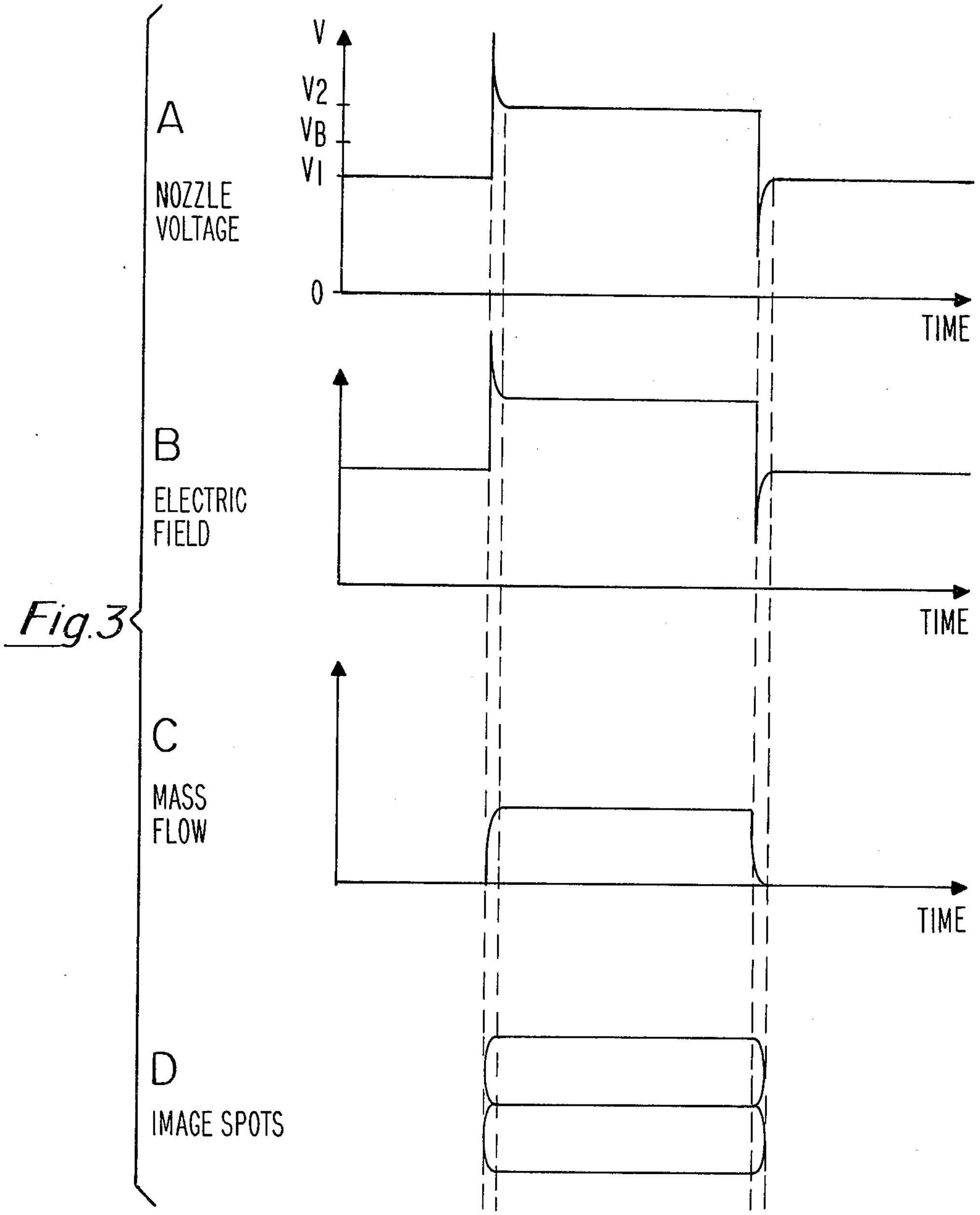
FIG. 3 shows the effect of altering the voltage waveform applied to the nozzle of the prior art system, said voltage waveform altered by the addition of short time duration "spikes" on the leading and trailing edges of the voltage waveform.
Figure 4:
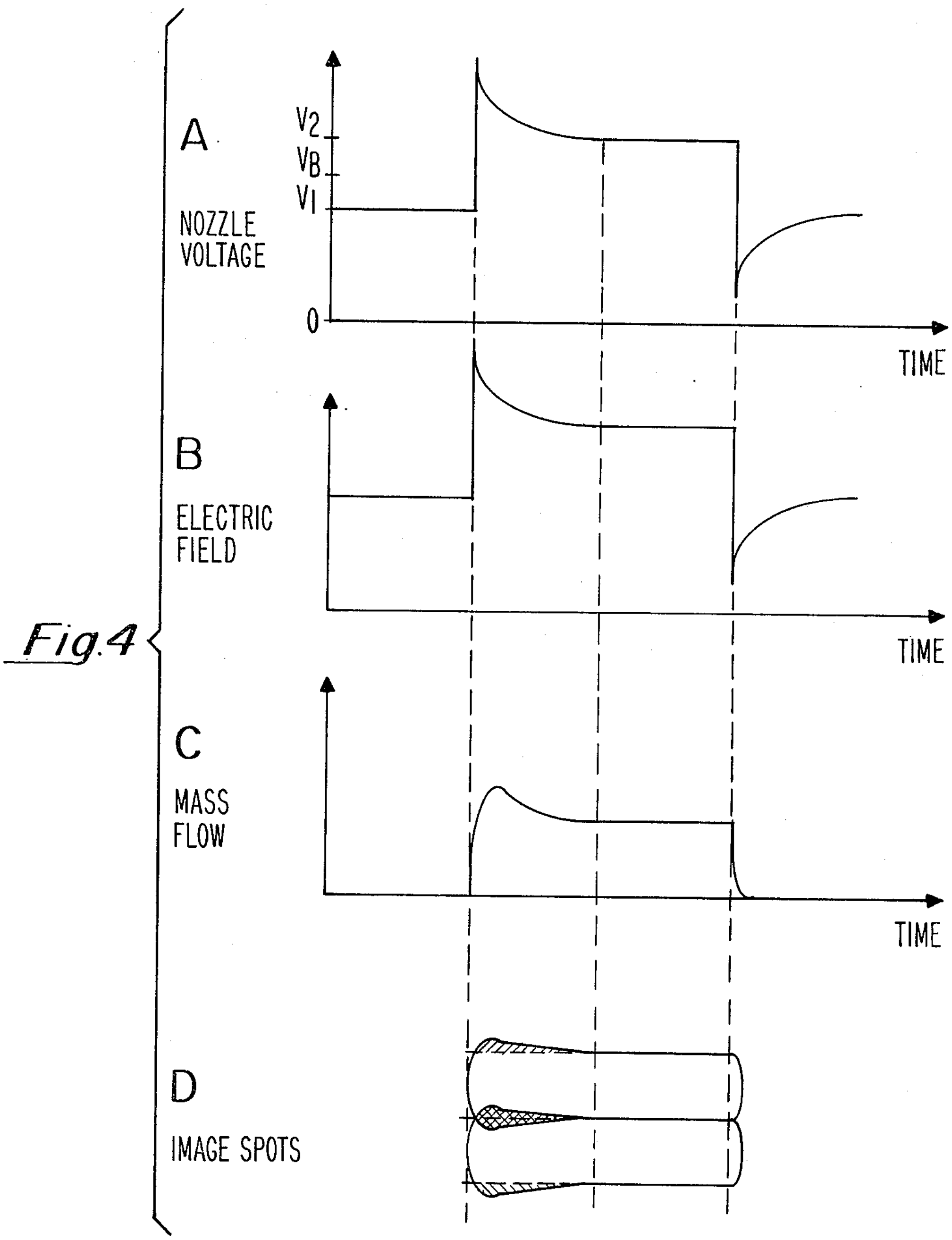
FIG. 4 shows the undesirable effects of altering the voltage waveform applied to the nozzle of the prior art system, said voltage waveform altered by the addition of relatively long duration "spikes" on the leading and trailing edges of the voltage waveform.

At this point, it should be obvious that a great improvement in mass flow and the images produced will result if the voltage signal applied by the prior art system and resultant electric field (FIGS. 1 and 2) is modified to correspond to that shown in FIG. 3. However, both design and cost limitations make it extremely difficult to provide a bias/amplifier unit 26 which can generate the voltage waveform of FIG. 3.

Figure 5:
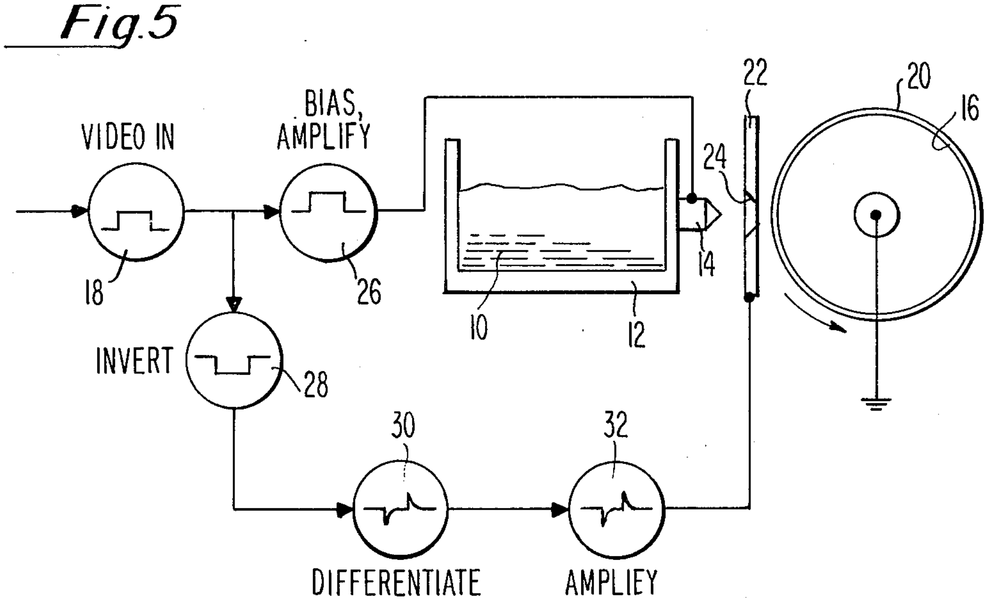
PRIOR ART Fig.5
FIG. 5 shows the improved electrostatic ink jet printing system of the present invention.

The present invention (FIG. 5) overcomes these limitations and can be implemented at a low cost. In FIG. 5, the video in signal is biased and amplified and then applied to the nozzle 14 as in the prior art system of FIG. 1. In the present invention, the video in signal is also fed to invertor 28. The inverted video in signal is then fed into differentiator 30. Differentiator 30 acts as a slope (or rate of change) detector, which responds to detecting a change in direction of its input waveform by generating a spike proportional to the rate of change. Thus, when differentiator 30 detects a change in the voltage signal fed into it, it generates at its output a spike which is proportional to the rate of change in the incoming signal. The signal generated by differentiator 30 is amplified in linear amplifier 32 and the output of amplifier 32 is applied to plate 22.

Figure 6:
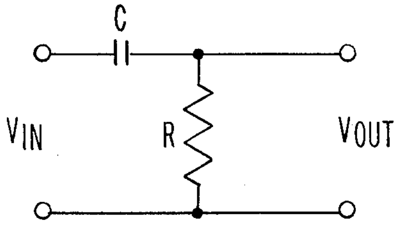
FIG. 6 shows an exemplary circuit which may be used to implement a differentiator of the type utilized in the present invention.

The differentiator 30 may be implemented using circuitry well known in the prior art. An example of a circuit which may be used to perform the required differentiating function is shown in FIG. 6. The selection of the component values in FIG. 6 will depend on the desired duration of the spikes and will be obvious to those of ordinary skill in the art.

Figure 7:
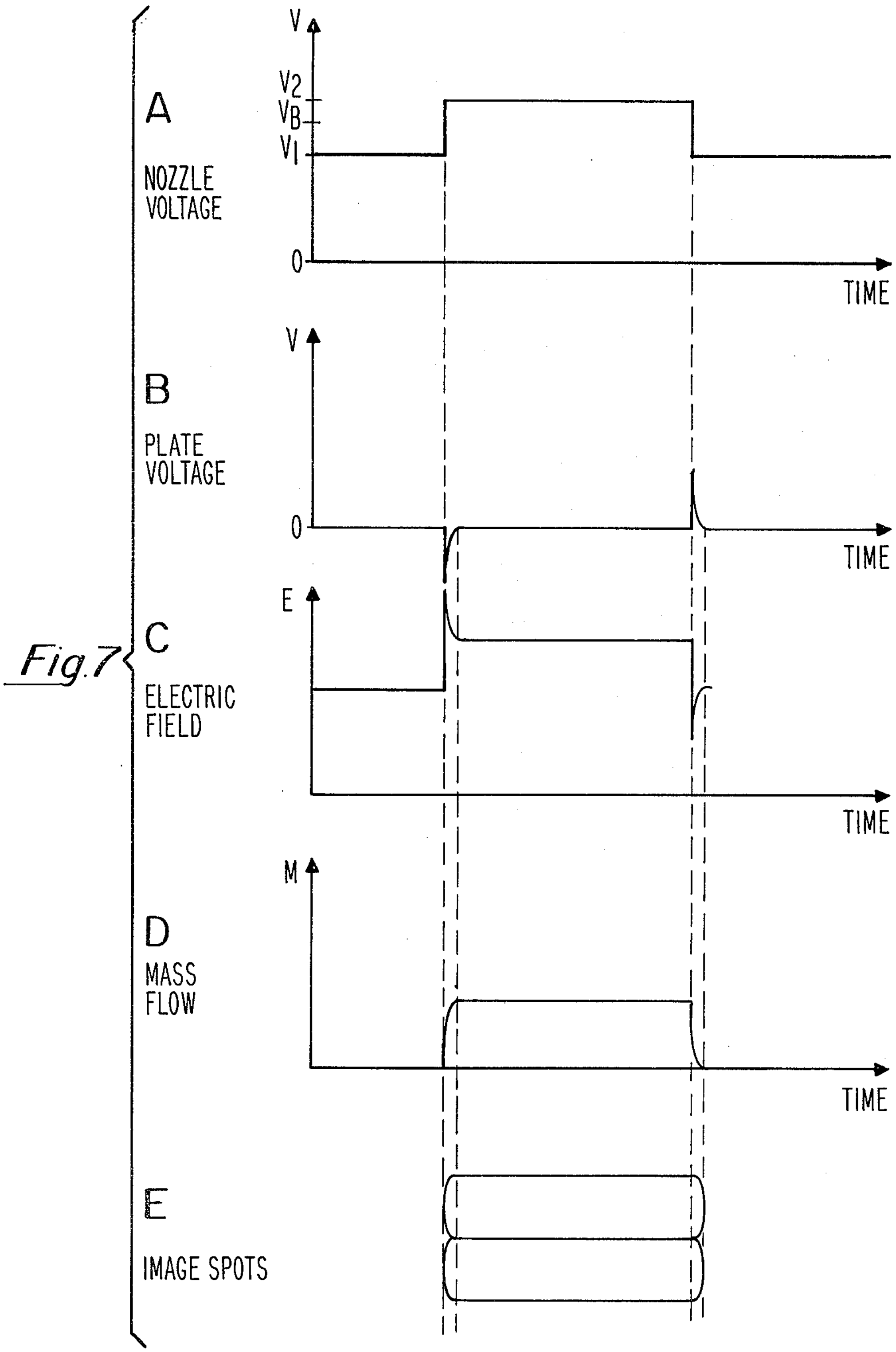
FIG. 7 shows the nozzle voltage waveform, plate voltage waveform, electric field, mass flow and image spots produced by applying a video signal data bit to the improved system of FIG. 5.

FIG. 7 shows the signals produced by the preferred embodiment of the present invention (FIG. 5). The voltage signal applied to the nozzle 14 (FIG. 7A) is identical with the prior art system. The voltage signal output by amplifier 32 and applied to plate 22 is shown in FIG. 7B. The combined effect of the applied nozzle voltage (FIG. 7A) and plate voltage (FIG. 7B) produces an electric field between the nozzle 14 and plate 22 as shown in FIG. 7C. This electric field meets the previously discussed goal of providing the electric field shown in FIG. 3B. As a result of providing the electric field of FIG. 7C, the mass flow (FIG. 7D) and image produced (FIG. 7E) by the present invention are improved over that obtained in the prior art system.

In the preferred embodiment of the present invention, amplifier 32 amplifies the signal from differentiator 30 so that the positive spikes have a positive peak level of $(V_2-V_1)$ and the negative spikes have a negative peak level of $-(V_2-V_1)$. Thus, for a value of $V_2=4$ KV and $V_1=2$ KV, the height of the spikes will be plus or minus 2 KV. It should be noted that even if the spikes applied to plate 22 are not at the preferred level, the application of spikes of any peak level will result in an improvement in performance over the prior art system of FIG. 1.

The time duration of the spikes in FIG. 7B is controlled by the differentiator circuit 30. In FIG. 7B, the time duration of the "spikes" is short so that the mass flow and image spots do not overshoot. The selection of differentiator 30 components to minimize overshoot is well documented in the prior art. See, for example, pgs. 27–35 of Millman, "Pulse, Digital, and Switching Waveforms", published by McGraw-Hill in 1965.

Those skilled in the circuit design arts will appreciate that the signal output by the differentiator 30 may alternatively be reshaped before it is amplified by amplifier 32 or reshaped at the output of the amplifier 32. For example, the signals output by differentiator 30 may be fed into a circuit (not shown) which provides a fixed positive voltage output (or positive square wave) whenever the differentiator 30 output is greater than zero and a fixed negative output (or negative square wave) whenever the differentiator 30 output is less than zero.

As another alternative, the differentiator 30 can be replaced with a circuit which generates a square pulse whenever its input signal rises above or below a certain level, respectively.

As still another alternative, the differentiator 30 can be replaced with two thresholding circuits (not shown), the first thresholding circuit responsive to a negative going transition at the output of invertor 28 to provide a negative square pulse as the input to amplifier 32. In such case, the second thresholding circuit would be responsive to a positive going transition at the output of invertor 28 to provide a positive square pulse as the input to amplifier 32. In the latter case, the time duration of the square pulses are chosen to maximize the frequency response without producing undesirable effects such as overshoot. The design of such digital thresholding circuits will be obvious to those of ordinary skill in the art.

Figure 8:
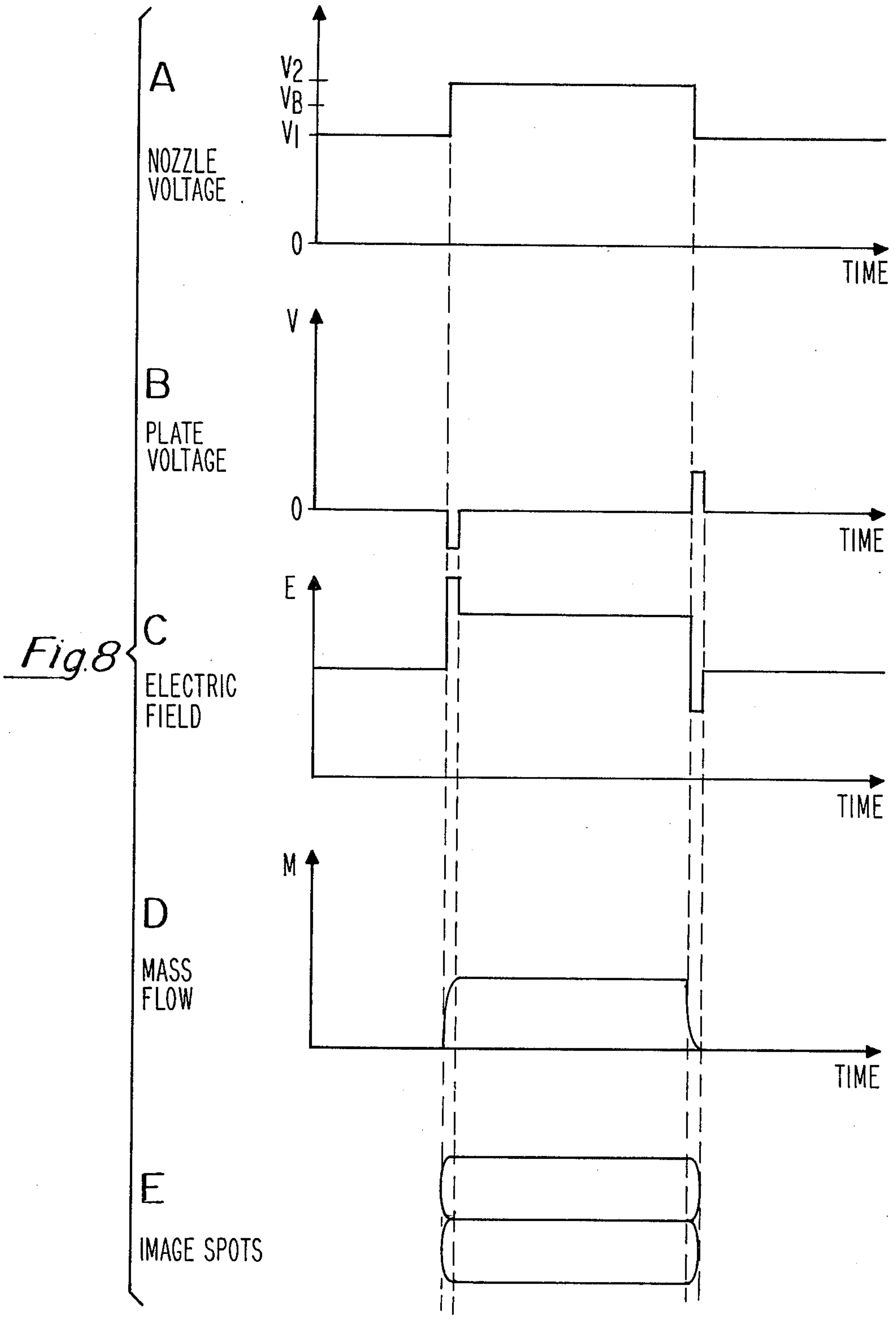
FIG. 8 shows the nozzle voltage waveform, plate voltage waveform., electric field, mass flow and image spots produced by applying a video signal data bit to the alternate embodiment of the present invention.

When such a circuit is alternatively added between the differentiator 30 and amplifier 32 or as a replacement for differentiator 30, the amplifier 2 applies to the plate 22 the voltage waveform shown in FIG. 8B. In such case, negative square pulse is applied to the plate 22 during times of increasing voltage on the nozzle 14 and a positive square pulse is applied to the plate 22 during times of decreasing voltage on the nozzle 14. The combined effect of the applied nozzle 14 voltage (FIG. 8A) and plate 22 voltage (FIG. 8B) produces an electric field between the nozzle 14 and plate 22 as shown in FIG. 8C. This electric field greatly improves the mass flow and quality of the image produced as compared with the prior art system (FIGS. 1 and 2).

Having shown and described the preferred and alternate embodiments of the present invention, I state that the subject matter which I regard as being my invention is particularly pointed out and distinctly claimed in the following claims. Those skilled in the art to which the present invention pertains will appreciate that equivalents or modifications of, or substitutions for, parts of the specifically described embodiments of the invention may be made without departing from the scope of the invention as set forth in what is claimed.

What is claimed is:

1. An ink jet printing system responsive to a video signal input waveform, said system comprising:
- an ink jet nozzle;
- means for supplying a liquid imaging material to said nozzle;
- a conductive platen, positioned in spaced relationship to and opposite the exit oriface of said nozzle;
- a recording member interposed between said platen and said nozzle;
- a conductive plate having an aperture, said plate positioned in spaced relation between said recording member and said nozzle;
- first means, responsive to said video signal input waveform, for producing and applying a first potential waveform between said plate and said platen; and
- second means, responsive to said video signal input waveform, for producing and applying a second potential waveform between said nozzle and said platen.

2. The ink jet printing system in accordance with claim 1 wherein said first means includes:
- invertor means for inverting said video signal input waveform; and
- differentiator means for generating a voltage signal proportional to the rate of change in the inverted video signal input waveform; and
- first amplifier means for amplifying the generated voltage signal.

3. The ink jet printing system in accordance with claim 1 wherein said second means includes:
- bias means for biasing the video signal input waveform; and
- amplifier means for amplifying the biased received video signal input waveform.

4. The ink jet printing system in accordance with claim 2 wherein said second means includes:
- bias means for biasing the received video signal input waveform; and
- second amplifier means for amplifying the biased received video signal input waveform.

5. The ink jet printing system in accordance with claim 4 wherein said platen is maintained at a ground potential level.

6. The ink jet printing system in accordance with claim 4 wherein said video signal input waveform switches between zero and approximately five volts, the five volt level specifying that a jet of said liquid imaging material is to be generated, the zero voltage level indicating that no jetting is to occur.

7. The ink jet printing system in accordance with claim 6 wherein said second potential waveform produced by said second means switches between approximately 2KV and 4KV, the 2KV level corresponding to the video signal input waveform being at the zero voltage level, the 4KV level corresponding to the video signal input waveform being at the five volt level.

8. The ink jet printing system in accordance with claim 2 or 3 wherein said differentiator means includes means for generating a voltage spike in response to each voltage transition in the inverted video signal input waveform, the polarity of each of the voltage spikes corresponding to the direction of the corresponding voltage transition in the inverted video signal input waveform.

9. The ink jet printing system in accordance with claim 8 wherein the time duration of each of said voltage spikes is less than the time that the inverted video signal remains at the corresponding transition level.

10. The ink jet printing system in accordance with claim 3 wherein said platen is a cylindrical drum, said recording member mounted on the outer surface of said cylindrical drum.

11. The ink jet printing system in accordance with claim 1 wherein said first means includes slope change detector means, responsive to a transition in the video signal input waveform, said slope change detector means for generating a single square wave pulse having the opposite polarity as the direction of the transition in the video signal input waveform.

12. The ink jet printing system in accordance with claim 11 wherein the duration of said single square wave pulse is less than the time between the corresponding transition in the video signal input waveform and the next following transition in the video signal input waveform.

13. The ink jet printing system in accordance with claim 1 wherein said first means includes thresholding means, responsive to a transition in the video signal input waveform which exceeds a threshold amount, said thresholding means for generating a single square wave pulse having the opposite polarity as the direction of the transition in the video signal input waveform.

14. The ink jet printing system in accordance with claim 13 wherein the duration of said single square wave pulse is less than the time between the corresponding transition in the video signal input waveform and the next following transition in the video signal input waveform.

15. The ink jet printing system in accordance with claim 11 or 13 wherein said second means includes:

bias means for biasing the received video signal input waveform; and amplifier means for amplifying the biased received video signal input waveform.

16. The ink jet printing system in accordance with claim 11 or 13 wherein said platen is maintained at a constant potential level.

* * * * *

UNITED STATES PATENT AND TRADEMARK OFFICE

CERTIFICATE OF CORRECTION

PATENT NO. : 4,477,869

DATED : October 16, 1984

INVENTOR(S) : Robert E. Rudd, III

It is certified that error appears in the above-identified patent and that said Letters Patent are hereby corrected as shown below:

In Claim 2, at Column 6, Line 35, delete "and".

In Claim 8, at Column 7, Line 2, delete "3" and substitute --4--.

Signed and Sealed this

*Sixteenth* Day of *April 1985*

[SEAL]

*Attest:*

DONALD J. QUIGG

*Attesting Officer* *Acting Commissioner of Patents and Trademarks*